(12) United States Patent
Harris et al.

(10) Patent No.: US 9,485,976 B1
(45) Date of Patent: Nov. 8, 2016

(54) TELESCOPING MULTI-LINE FISHING DEVICE

(71) Applicants: Ricky Harris, Miami, FL (US);
Tangela Harris, Miami, FL (US)

(72) Inventors: Ricky Harris, Miami, FL (US);
Tangela Harris, Miami, FL (US)

( * ) Notice: Subject to any disclaimer, the term of this patent is extended or adjusted under 35 U.S.C. 154(b) by 199 days.

(21) Appl. No.: 14/537,482

(22) Filed: Nov. 10, 2014

(51) Int. Cl.
*A01K 87/02* (2006.01)
*A01K 87/08* (2006.01)
*A01K 87/04* (2006.01)
*A01K 89/00* (2006.01)

(52) U.S. Cl.
CPC ............ *A01K 87/025* (2013.01); *A01K 87/04* (2013.01); *A01K 87/08* (2013.01); *A01K 89/006* (2013.01)

(58) Field of Classification Search
CPC .... A01K 87/02; A01K 87/025; A01K 69/00; A01K 91/10; A01K 91/053; A01K 97/12; A01K 99/00
USPC ............. 43/18.1 CT, 15, 16, 17, 26.1, 43.11, 43/43.15, 42.74
See application file for complete search history.

(56) References Cited

U.S. PATENT DOCUMENTS

| | | | | |
|---|---|---|---|---|
| 1,587,446 A * | 6/1926 | Viers | ..................... | A01K 87/025 43/18.1 CT |
| 3,163,957 A * | 1/1965 | Orval | ..................... | A01K 91/02 43/41.2 |
| 3,184,879 A * | 5/1965 | Ruhl | ...................... | A01K 91/06 43/42.74 |
| 3,447,254 A * | 6/1969 | Sobel | ................... | A01K 87/025 43/18.1 HR |
| 3,673,729 A * | 7/1972 | Lintz | ...................... | A01K 93/00 43/43.11 |
| 5,309,663 A | 5/1994 | Shirley | | |
| 6,247,262 B1 * | 6/2001 | Wallace | ................. | A01K 91/00 43/42.74 |
| 7,210,264 B1 | 5/2007 | Demetris | | |
| 8,347,546 B2 | 1/2013 | Rupp | | |

* cited by examiner

*Primary Examiner* — Joanne Silbermann
(74) *Attorney, Agent, or Firm* — Crossley & Stevenson Intellectual Property Law

(57) ABSTRACT

The telescoping multi-line fishing device including multiple fishing lines within an alternately expandable and collapsible structure that provides two telescopic sections connected to a center cylindrical casing with propeller power. Each section provides sliding tubes rotatably and slidably connected to each other. A quartet of spool housings in each section provides user settable timed fishing line and weighted leader release from a capsule. The spool housings features slow line extraction with automatic retraction upon a sharp tug from a fish. The fishing lines provide user set timed release. The device includes reeled retrieval.

13 Claims, 6 Drawing Sheets

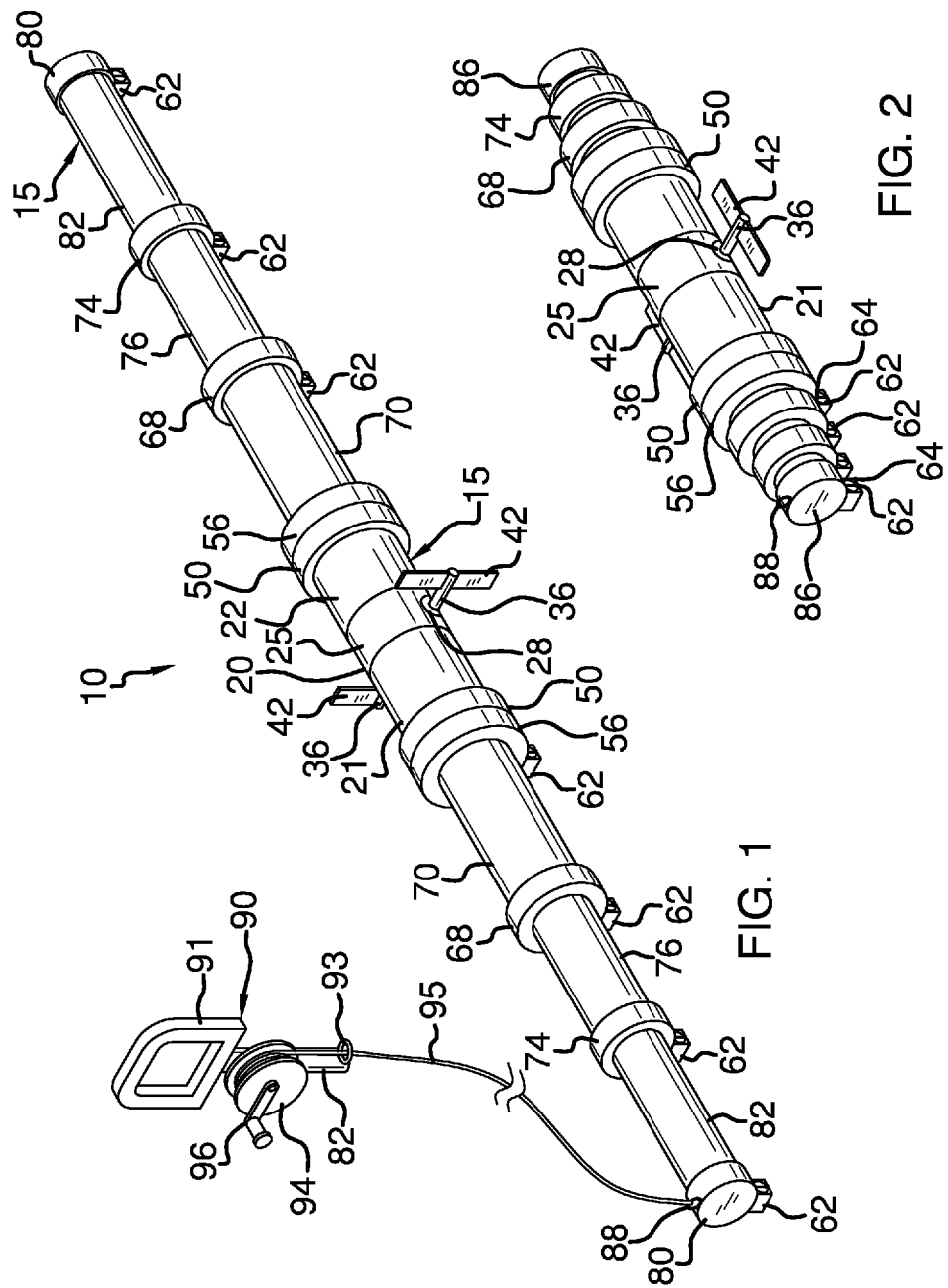

TELESCOPING MULTI-LINE FISHING DEVICE

BACKGROUND OF THE INVENTION

Various fishing devices are known in the prior art. None provide a fishing device that incorporates multiple fishing lines within an alternately expandable and collapsible structure that provides two telescopic sections connected to a center cylindrical casing with propeller power and with the fishing lines providing user timed release.

FIELD OF THE INVENTION

The present multi-line fishing device relates to fishing devices and more importantly to a multi-line and alternately expandable and collapsible structure that provides two telescopic sections connected to a center cylindrical casing with propeller power. The fishing lines provide user controlled timed release.

SUMMARY OF THE INVENTION

The general purpose of the telescoping multi-line fishing device, described subsequently in greater detail, is to provide a telescoping multi-line fishing device that has many novel features that result in a telescoping multi-line fishing device which is not anticipated, rendered obvious, suggested, or even implied by prior art, either alone or in combination thereof.

To accomplish this, the telescoping multi-line fishing device has a sealed self-propelled telescopic structure. The structure is alternately collapsible and extendable. The structure has central tube with a first half and a first end disposed on the first half. The tube also has a second half with a second end disposed on the second half. The tube further has a propeller housing disposed between the first half and the second half. A sealed sleeve divides a diameter of the propeller housing. A weight is disposed in a one portion of the divided propeller housing. A winding implement is disposed adjacent the weight. A pair of diametrically opposed partially extendable rotating shafts is extended from the winding implement to exterior the sleeve. A propeller is disposed on each shaft exterior the sleeve. A cylindrical casing is disposed on each of the first and second ends. The shafts are optionally turned and released to alternately wind the winding implement and to turn the propellers, respectively, to propel the structure.

A pair of telescopic sections is provided. Each section is optionally and separately extended and collapsed. Each section has a plurality of spool housings comprising a first spool housing, a second spool housing, a third spool housing, a capped spool housing with an externally mounted first eyelet. The spool housings have a progressively decreasing spool housing diameter. Each decreasing diameter begins from the second spool housing and continues to the capped spool housing. The first spool housing is affixed to one of the cylindrical casings by a dowelled fitting.

Each spool housing includes a rotatable spool wound with a line. A wound check spring is in operational communication with the spool. A ball bearing is in operational communication with the wound check spring. The wound check spring is configured to alternately release and retract upon a slow line extension and a fast line extension, respectively.

A plurality of sliding tubes is provided. Each sliding tube has a collar. A seal circumferentially surrounds each collar. The collars and sliding tubes each has a progressively decreasing diameter. Each sliding tube is affixed to one of the spool housings. The spool housings, collars and sliding tubes comprise the second spool housing affixed to a first sliding tube affixed to a first collar. The third spool housing is affixed to a second sliding tube affixed to a second collar. The capped spool housing is affixed to a third sliding tube affixed to a third collar. The first collar is slidably disposed within the central tube. The first sliding tube is slidably disposed within the cylindrical casing and the first spool housing. The second collar is slidably disposed within the first sliding tube. The second sliding tube is slidably disposed within the second spool housing. The third collar is slidably disposed within the second sliding tube. The third sliding tube is slidably disposed within the third spool housing. Importantly, each collar is sealed against a water invasion into the respective central tube and sliding tubes by a seal circumferentially disposed around each collar.

A plurality of capsules is also provided with one of each capsule being disposed on each of the spool housings. Each capsule has a weighted leader optionally disposed within. Each capsule has a door and with door timer in operational communication with the door. Each door timer is set by hand via a timer control. The weighted leader is attached to the line. The timer control determines an elapsed time opening of the door. Door opening provides for weighted leader release. An important convenience is provided therein as a user can choose when to release each weighted leader. Each of the second spool housing, the third spool housing and the sliding tubes is free to rotate within the respectively larger diameter spool housings. With an influence of the weighted leader each capsule is automatically located in a downward position in water.

A reel support is provided. The support has a handle affixed to a stalk. A second eyelet is disposed on the stalk. A rotating reel is disposed on the stalk. A crank is in communication with the reel. A cord is optionally wound around the reel and passed through the guiding second eyelet. The cord is optionally affixed to the first eyelet wherein the structure is optionally retrieved by the reel.

Thus has been broadly outlined the more important features of the present telescoping multi-line fishing device so that the detailed description thereof that follows may be better understood and in order that the present contribution to the art may be better appreciated.

BRIEF DESCRIPTION OF THE DRAWINGS

Figures

FIG. 1 is a perspective view of a telescoping multi-line fishing device.

FIG. 2 is a perspective view of a collapsed structure of the device.

DETAILED DESCRIPTION OF THE DRAWINGS

Figure 3:
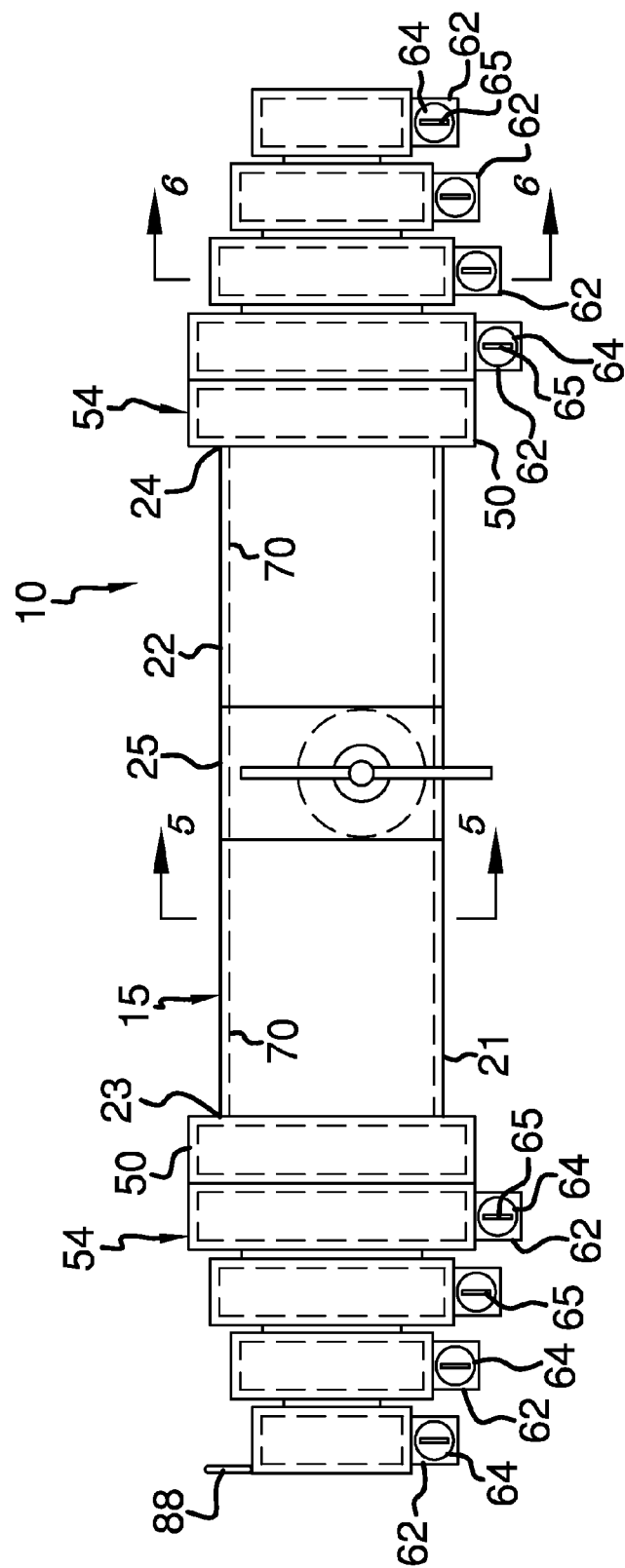
FIG. 3 is a frontal view of the collapsed structure.
Figure 4:
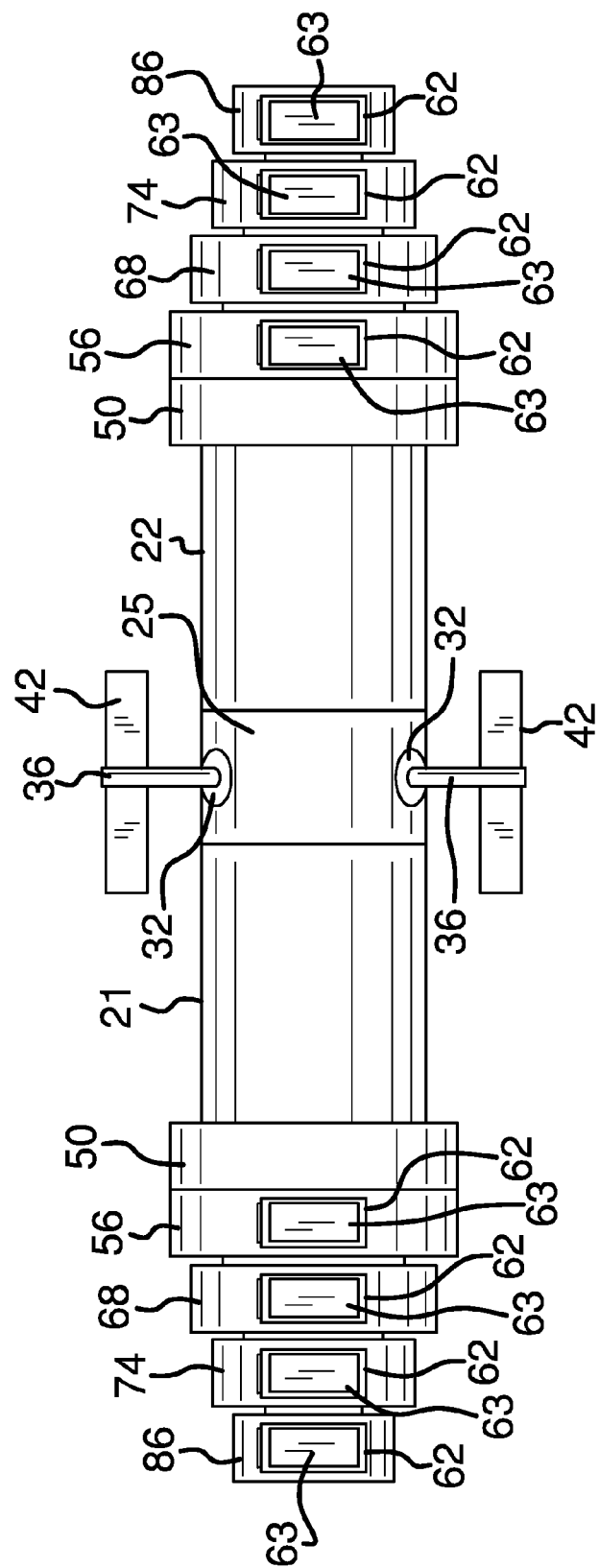
FIG. 4 is a bottom plan view of the collapsed structure.
Figure 5:
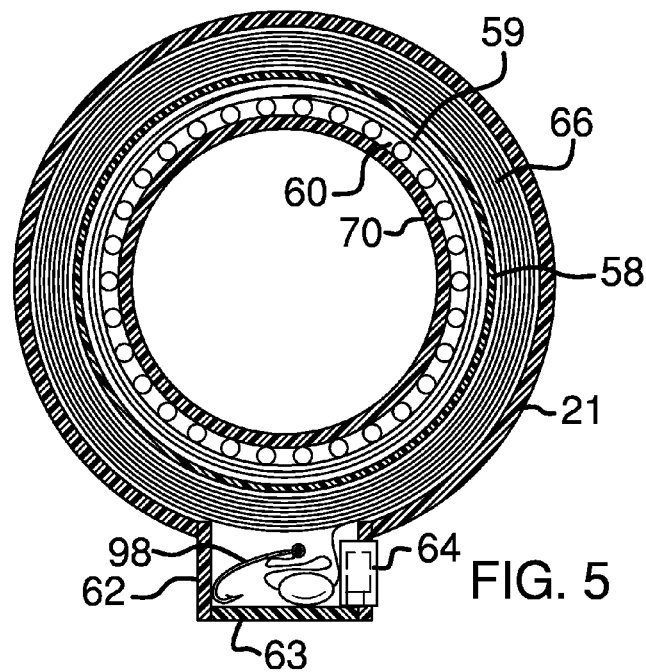
FIG. 5 is a cross sectional view of the structure of FIG. 3, taken along the line 5-5.
Figure 6:
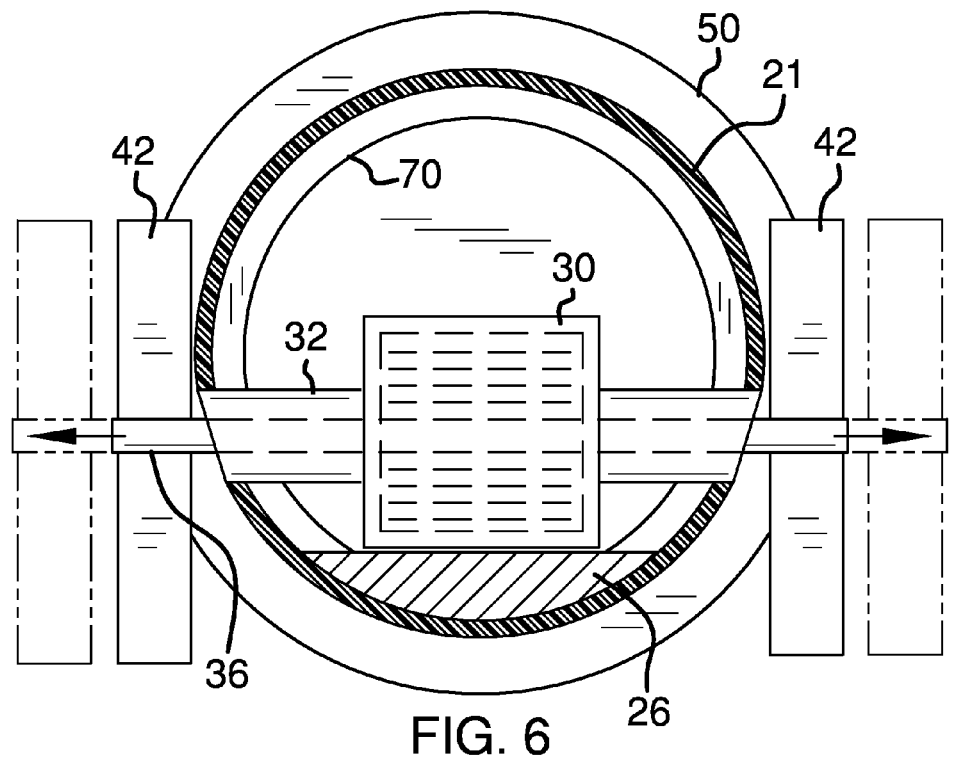
FIG. 6 is a cross sectional view of the structure of FIG. 3, taken along the line 6-6.
Figure 7:
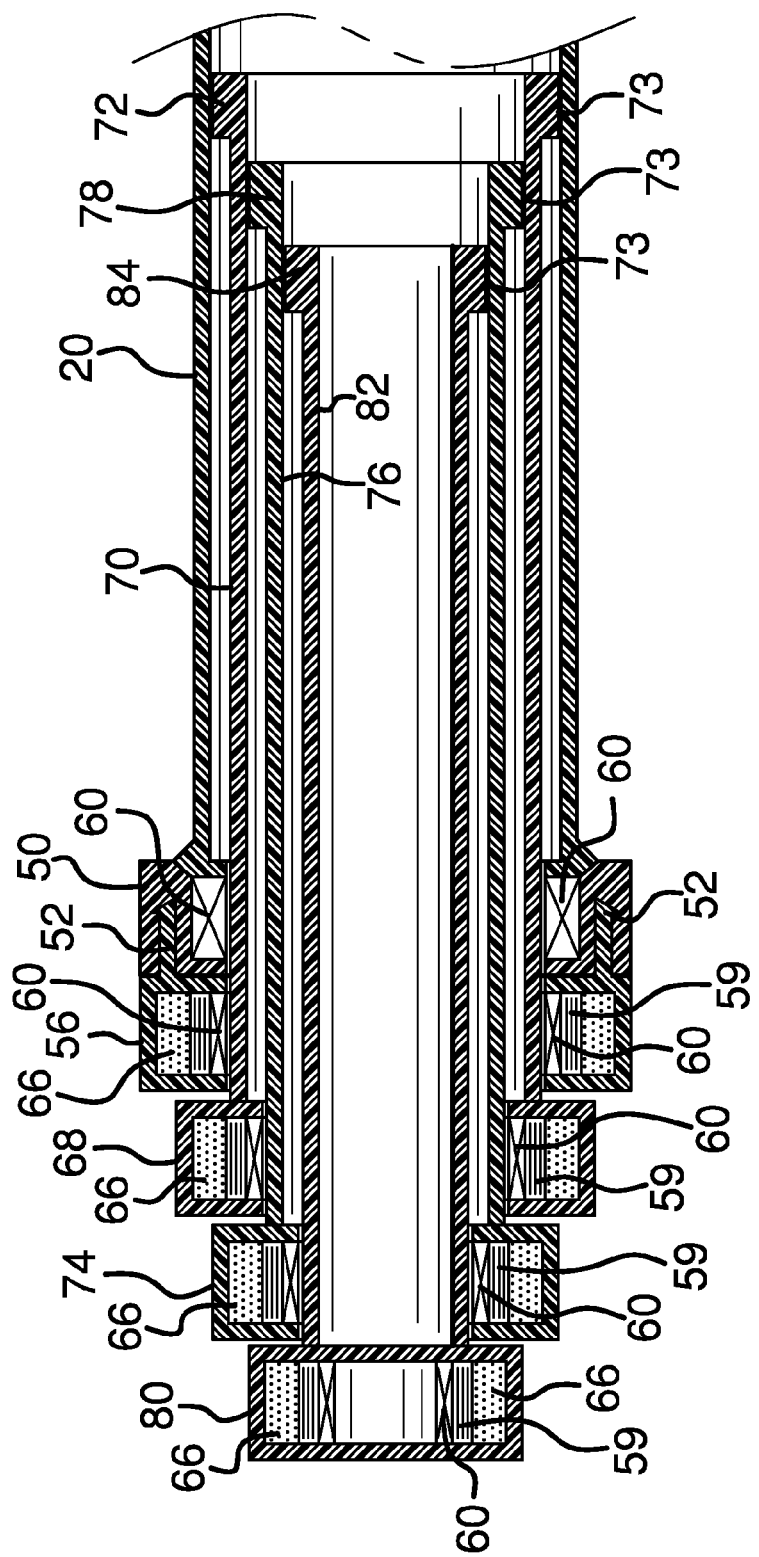
FIG. 7 is cross sectional view of a telescopic section.
Figure 8:
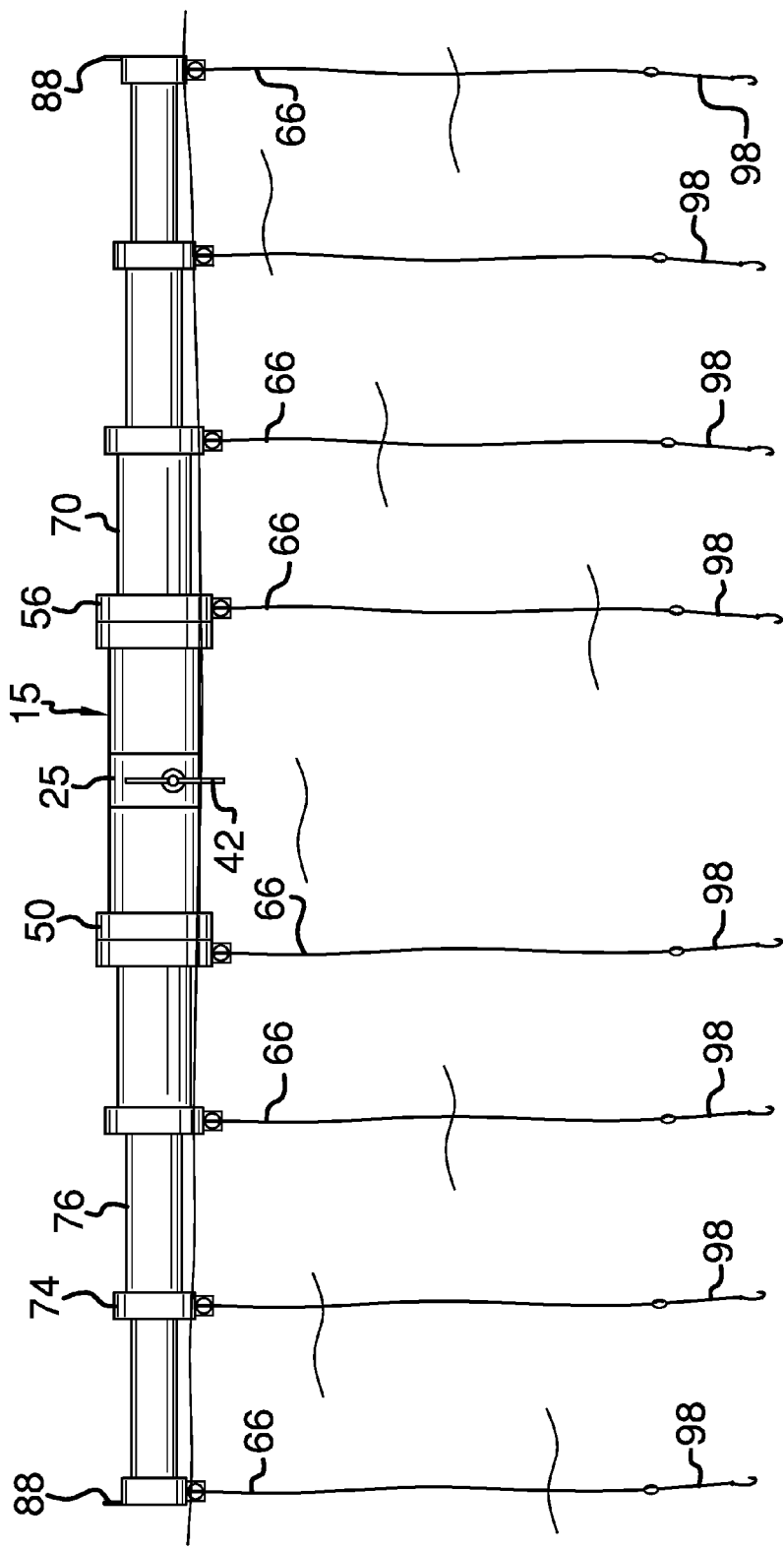
FIG. 8 is a view of the structure in use.

With reference now to the drawings, and in particular FIGS. 1 through 8 thereof, an example of the telescoping multi-line fishing device employing the principles and concepts of the present telescoping multi-line fishing device and generally designated by the reference number 10 will be described.

To accomplish this, the telescoping multi-line fishing device 10 has a sealed self propelled telescopic structure 15 that is alternately collapsible and extendable. The structure 15 has central tube 20 with a first half 21 and a first end 23 disposed on the first half 21. The tube 20 also has a second half 22 with a second end 24 disposed on the second half 22. The tube 20 further has a propeller housing 25 disposed between the first half 21 and the second half 22. A sealed sleeve 32 divides a diameter of the propeller housing 25. A weight 26 is disposed in a one portion of the divided propeller housing 25. A winding implement 30 is disposed adjacent the weight 26. A pair of diametrically opposed partially extendable rotating shafts 36 is extended from the winding implement 30 to exterior the sleeve 32. A propeller 42 is disposed on each shaft 36 exterior the sleeve 32. A cylindrical casing 50 is disposed on each of the first and second end 23, 24. The shafts 36 are optionally turned and released to alternately wind the winding implement 30 and to turn the propellers 42, respectively, to propel the structure 15.

A pair of telescopic sections 54 is provided. Each section 54 has a plurality of spool housings comprising a first spool housing 56, a second spool housing 68, a third spool housing 74, a capped spool housing 80 with an externally mounted first eyelet 88. The spool housings have a progressively decreasing spool housing diameter. Each decreasing diameter begins from the second spool housing 68 to the capped spool housing 80. The first spool housing 56 is affixed to one of the cylindrical casings 50 by a dowelled fitting 52.

Each spool housing includes a rotatable spool 58 wound with a line 66. A wound check spring 59 is in operational communication with the spool 58. A ball bearing 60 is in operational communication with the wound check spring 59. The wound check spring 59 is configured to alternately release and retract upon a slow line 66 extension and a fast line 66 extension, respectively.

A plurality of sliding tubes is provided. Each sliding tube has a collar. The collars and sliding tubes each has a progressively decreasing diameter. Each sliding tube is affixed to one of the spool housings 56, 68, 74, and 80. The spool housings, collars and sliding tubes comprise the second spool housing 68 affixed to a first sliding tube 70 affixed to a first collar 72. The third spool housing 74 is affixed to a second sliding tube 76 affixed to a second collar 78. The capped spool housing 80 is affixed to a third sliding tube 82 affixed to a third collar 84. The first collar 72 is slidably disposed within the central tube 20. The first sliding tube 70 is slidably disposed within the cylindrical casing 50 and the first spool housing 56. The second collar 78 is slidably disposed within the first sliding tube 70. The second sliding tube 76 is slidably disposed within the second spool housing 68. The third collar 84 is slidably disposed within the second sliding tube 76. The third sliding tube 82 is slidably disposed within the third spool housing 74. Each collar 72, 78, 84 is sealed against a water invasion into the respective central tube 20 and sliding tubes 70, 76, and 82 by a seal 73 circumferentially disposed around each collar 72, 78, 84.

A plurality of capsules 62 is provided. A one of each capsule 62 is disposed on each of the spool housings 56, 68, 74, and 80. Each capsule 62 has a weighted leader 98 optionally disposed within. Each capsule 62 has a door 63 and with door timer 64 in operational communication with the door 63. Each door timer 64 is set by hand with a timer control 65. The weighted leader 98 is optionally attached to the line 66. The timer control 65 determines an elapsed time opening of the door 63. Door 63 opening provides for weighted leader 98 release. Each of the second spool housing 68, the third spool housing 74 and the sliding tubes 70, 76, and 82 is free to rotate with within the respectively larger diameter spool housings 56, 68, and 74 with an influence of the weighted leader 98, therein automatically locating each capsule 62 in a downward position in water.

A reel support 90 is provided. The support 90 has a handle 91 affixed to a stalk 92. A second eyelet 93 is disposed on the stalk 92. A rotating reel 94 is disposed on the stalk 92. A crank 96 is in communication with the reel 94. A cord 95 is optionally wound around the reel 94 and passed through the guiding second eyelet 93. The cord 95 is optionally affixed to the first eyelet 88 wherein the structure 15 is optionally retrieved by the reel 94.

What is claimed is:

1. A telescoping multi-line fishing device comprising:
   a sealed telescopic structure having a central tube, the central tube having a first end, a second end opposite the first end, and a cylindrical casing disposed on each of the first and second ends;
   a pair of telescopic sections, each section having a plurality of spool housings comprising a first spool housing, a second spool housing, a third spool housing, and a capped spool housing, each of the spool housings having a progressively decreasing spool housing diameter from the second spool housing to the capped spool housing, the first spool housing being affixed to one of the cylindrical casings;
   wherein each spool housing comprises a rotatable spool wound with a line;
   a wound check spring in operational communication with the spool;
   wherein the wound check spring is configured to alternately release and retract upon a slow line extension and a fast line extension, respectively;
   a plurality of sliding tubes, each sliding tube having a collar, each of the collars and sliding tubes having a progressively decreasing diameter corresponding to the decreasing diameters of the respective sliding tubes and spool housings, each sliding tube affixed to a spool housing, the spool housings, collars, and sliding tubes comprising the second spool housing affixed to a first sliding tube affixed to a first collar, the third spool housing affixed to a second sliding tube affixed to a second collar, the capped spool housing affixed to a third sliding tube affixed to a third collar;
   wherein the first collar is slidably disposed within the central tube, the first sliding tube slidably disposed within the cylindrical casing and the first spool housing;
   wherein the second collar is slidably disposed within the first sliding tube, the second sliding tube slidably disposed within the second spool housing;
   wherein the third collar is slidably disposed within the second sliding tube, the third sliding tube slidably disposed within the third spool housing;
   a plurality of capsules, one capsule being disposed on one of each spool housing, each capsule having a weighted leader disposed therein, each capsule further having a door, the weighted leader attached to the line of the capsule, wherein the leader and the line of the capsule are released through the door.

2. The device of claim 1 further comprising:
   an eyelet disposed on each capped housing;
   wherein the eyelets are affixed with a retrieval cord.

3. The device of claim 2 wherein the first spool housing is affixed to the cylindrical casing by a dowelled fitting.

4. The device of claim 2 wherein a seal is circumferentially disposed around each collar.

5. The device of claim 1 wherein the first spool housing is affixed to the cylindrical casing by a dowelled fitting.

6. The device of claim 5 wherein a seal is circumferentially disposed around each collar.

7. The device of claim 1 wherein a seal is circumferentially disposed around each collar.

8. A telescoping multi-line fishing device comprising:
- a sealed telescopic structure having a central tube having a first end spaced apart from a second end, a cylindrical casing disposed on each of the first and second ends;
- a pair of telescopic sections, each section having a plurality of spool housings comprising a first spool housing, a second spool housing, a third spool housing, a capped spool housing, the spool housings having a progressively decreasing spool housing diameter each from the second spool housing to the capped spool housing, the first spool housing affixed to one of the cylindrical casings;
- a first eyelet disposed on the capped spool housing;
- wherein each spool housing comprises a rotatable spool wound with a line, a wound check spring in operational communication with the spool;
- wherein the wound check spring is configured to alternately release and retract upon a slow line extension and a fast line extension, respectively;
- a plurality of sliding tubes, each sliding tube having a collar, each of the collars and sliding tubes having a progressively decreasing diameter corresponding to the decreasing diameters of the respective sliding tubes and spool housings, each sliding tube affixed to a spool housing, the spool housings, collars and sliding tubes comprising the second spool housing affixed to a first sliding tube affixed to a first collar, the third spool housing affixed to a second sliding tube affixed to a second collar, the capped spool housing affixed to a third sliding tube affixed to a third collar;
- wherein the first collar is slidably rotatably disposed within the central tube, the first sliding tube slidably rotatably disposed within the cylindrical casing and the first spool housing;
- wherein the second collar is slidably rotatably disposed within the first sliding tube, the second sliding tube slidably disposed within the second spool housing;
- wherein the third collar is slidably rotatably disposed within the second sliding tube, the third sliding tube slidably disposed within the third spool housing;
- a plurality of capsules, one of each capsule being disposed on each spool housing, each capsule having:
  - a weighted leader disposed therein, the weighted leader attached to the line;
  - a door;
  - a door timer in operational communication with the door;
- wherein the leader and the line are released by the door.

9. The device of claim 8 further comprising a real support having a handle, a stalk affixed to the handle, a rotating reel disposed on the stalk, a crank in communication with the reel, a cord optionally wound around the reel, the cord affixed to the first eyelet;
wherein the structure is retrieved by the reel.

10. The device according to claim 9 further comprising a door timer in operational communication with the door, the door timer having a timer control, the weighted leader attached to the line;
- wherein the timer control determines an elapsed time opening of the door; and
- wherein the weighted leader is released.

11. The device according to claim 8 further comprising a door timer in operational communication with the door, the door timer having a timer control, the weighted leader attached to the line;
- wherein the timer control determines an elapsed time opening of the door; and
- wherein the weighted leader is released.

12. A telescoping multi-line fishing device comprising:
- a sealed alternately collapsible and extendable self propelled telescopic structure having a central tube having a first half, a first end disposed on the first half, a second half, a second end disposed on the second half, a propeller housing disposed between the first half and the second half, a sealed sleeve bisecting a diameter of the propeller housing, a weight disposed in one portion of the divided propeller housing, a winding implement disposed adjacent the weight, a pair of diametrically opposed partially extendable rotating shafts extended from the winding implement to exterior the sleeve, a propeller disposed on each shaft exterior the sleeve, a cylindrical casing disposed on each of the first and second ends;
- wherein the shafts are optionally turned and released to alternately wind the winding implement and to turn the propellers to propel the structure;
- a pair of telescopic sections, each section having a plurality of spool housings comprising a first spool housing, a second spool housing, a third spool housing, a capped spool housing with an externally mounted first eyelet, the spool housings having a progressively decreasing spool housing diameter each from the second spool housing to the capped spool housing, the first spool housing affixed to one of the cylindrical casings by a dowelled fitting;
- wherein each spool housing comprises a rotatable spool wound with a line, a wound check spring affixed to the spool, a ball bearing in operational communication with the wound check spring;
- wherein the wound check spring is configured to alternately release and retract upon a slow line extension and a fast line extension, respectively;
- a plurality of sliding tubes, each sliding tube having a collar, each of the collars and sliding tubes having a progressively decreasing diameter corresponding to the decreasing diameters of the respective sliding tubes and spool housings, each sliding tube affixed to a spool housing, the spool housings, collars and sliding tubes comprising the second spool housing affixed to a first sliding tube affixed to a first collar, the third spool housing affixed to a second sliding tube affixed to a second collar, the capped spool housing affixed to a third sliding tube affixed to a third collar;
- wherein the first collar is slidably disposed within the central tube, the first sliding tube slidably disposed within the cylindrical casing and the first spool housing;
- wherein the second collar is slidably disposed within the first sliding tube, the second sliding tube slidably disposed within the second spool housing;

wherein the third collar is slidably disposed within the second sliding tube, the third sliding tube slidably disposed within the third spool housing;

a plurality of capsules, one of each capsule disposed on each spool housing, each capsule having:

a weighted leader disposed within, the weighted leader attached to the line;

a door;

a door timer in operational communication with the door;

wherein the timer control determines an elapsed time opening of the door;

wherein the weighted leader is released by the door opening;

a reel support having a handle, a stalk affixed to the handle, a second eyelet disposed on the stalk, a rotating reel disposed on the stalk, a crank in communication with the reel, a cord wound around the reel and passed through the second eyelet, the cord affixed to the first eyelet; and wherein the structure is retrieved by the reel.

13. The device of claim 12 further comprising a seal circumferentially disposed around each collar.

\* \* \* \* \*